J. B. HAINES.
Fruit-Gatherer.
No. 64,096.
Patented Apr. 23, 1867.
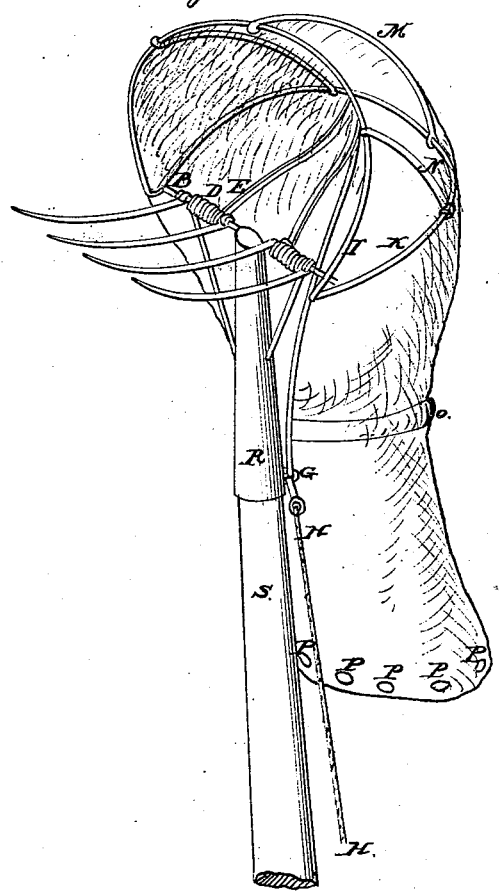
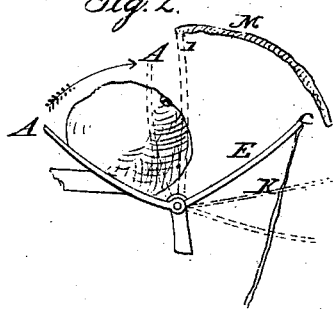
Witnesses.
Joseph C. Haines
D. M. Stauffer
Inventor.
Jacob B. Haines

United States Patent Office

JACOB B. HAINES, OF MILLERSVILLE, PENNSYLVANIA.

Letters Patent No. 64,096, dated April 23, 1867.

IMPROVEMENT IN FRUIT-GATHERER

*The Schedule referred to in these Letters Patent and making part of the same.*

TO ALL WHOM IT MAY CONCERN:

Be it known that I, JACOB B. HAINES, of Millersville, in the county of Lancaster, and State of Pennsylvania, have invented a new and improved Arrangement in a Fruit-Gatherer; and I do hereby declare that the following is a full and exact description thereof, reference being had to the accompanying drawings, making a part of this specification, in which—

Figure 1 is a perspective view of the combination and arrangement of the same.

Figure 2 illustrates the operation in one position.

Among the numerous devices for picking or gathering fruit, some of which are very good, yet not one embraces all the points desired, viz, to enable a person to approach the fruit, in whatever position it may be attached, and to act directly on the fruit so as to draw it from its connection to the branch and deliver it directly into the bag or sleeve by means of fingers slightly curved but easily slid between the fruit and the branch.

The drawing so clearly shows the construction as to enable any one skilled in the business to make this implement. R shows a tin pipe for the reception of a handle, S, of any desired length. A shaft, B, is welded or otherwise affixed across the top of the pipe R. To the ends of this cross-shaft B there is a horizontal wire curving backwards, K, forming the base or throat, also another wire curved vertically across from end to end, forming the anterior upper portion, I. This is shown as slightly projecting below in advance of the stationary shaft B. The four curved fingers, A, are connected with E, and act in unison by being coiled jointly around the fixed shaft B, the ends E being carried back into the throat and their looped ends connected with the actuating wire F. The coiled springs on each side of the pipe R, around the shaft B, and finger and lever coils A E, extend downwards and are connected with the pipe on each side, as shown, D'. To complete the frame and to connect the horizontal bow K with the vertical bow or curve I, there is a central curved wire, M, and another on each side, L N, soldered or firmly secured. This framework, pipe, and shaft might be made of malleable iron, as also the fingers and lever ends. By covering the framework with a bag or open sleeve, N, and by carrying the actuating wire F through a loop, G, near the base of the pipe, and connecting a cord, H, to the eye or loop $i$ of said wire it can be operated at any distance, according to the length of the pole. The sleeve N shows an elastic cord, O, intended to check the fruit in its descent to the ground. These cords may be at suitable intervals and adapted to the size of the fruit. The sleeve N also shows a series of buttons, P, at its base. These are with a view to connect a bag or for extending the sleeve to any length desired.

I am aware that elastic sleeves are not new for gathering fruit, and also of numerous arrangements of fixed and movable jaws, fingers, or shears, variously combined and arranged. But I am not aware of any arrangement that makes the gatherer so universally applicable and adapted to getting under the fruit and drawing it directly from the branch, as by hand picking, delivering the fruit without fear of failure directly into the sleeve. The ease with which the fingers are operated, the lightness and neatness of the implement; all points considered, as herein arranged and shown, seem to meet the approbation of all, without interfering with the claims and arrangements of others devised with the same object in view.

What I claim as my invention, and desire to secure by Letters Patent, is—

The arrangement of the fingers A and lever arms E, in combination with the coiled springs D, all surrounding a rigid shaft, B, centrally affixed to the top of the pipe R, and also connected with the horizontal and vertical bows I K, the latter connected by cross-curves L M N, operating jointly in the manner and for the purpose specified.

In combination with the specific framework I also claim the use of a sleeve or bag, N, elastic bands O, buttons P, actuating wire F, cord H, and handle S, all arranged and operating in the manner and for the purpose set forth.

JACOB B. HAINES.

Witnesses:
D. M. STAUFFER,
JOSEPH C. HAINES.